United States Patent
Hiltz-Laforge et al.

(10) Patent No.: US 9,396,567 B2
(45) Date of Patent: Jul. 19, 2016

(54) GENERATING A CHART SPECIFICATION BASED ON IMAGE RECOGNITION OF CHART PARTS

(71) Applicant: International Business Machines Corporation, Armonk, NY (US)

(72) Inventors: Jason Hiltz-Laforge, Ottawa (CA); Robert Y. Nonez, Orleans (CA); Alireza Pourshahid, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 14/153,152

(22) Filed: Jan. 13, 2014

(65) Prior Publication Data

US 2015/0199830 A1 Jul. 16, 2015

(51) Int. Cl.
*G06F 17/30* (2006.01)
*G06F 7/00* (2006.01)
*G06T 11/20* (2006.01)
*G06K 9/00* (2006.01)

(52) U.S. Cl.
CPC ........ *G06T 11/206* (2013.01); *G06F 17/30247* (2013.01); *G06F 17/30663* (2013.01); *G06K 9/00476* (2013.01)

(58) Field of Classification Search
CPC .................................................... G06T 11/206
USPC ....................................................... 707/748
See application file for complete search history.

(56) References Cited

U.S. PATENT DOCUMENTS

| | | | |
|---|---|---|---|
| 7,584,415 B2 | 9/2009 | Cory et al. | |
| 8,271,892 B2 | 9/2012 | Duncker et al. | |
| 9,035,949 B1 * | 5/2015 | Oberheu | G06T 11/206 345/440 |
| 9,213,554 B2 * | 12/2015 | Kumar | G06F 9/4443 |
| 2004/0080514 A1 * | 4/2004 | Dorwart | G06F 17/246 345/581 |
| 2005/0119990 A1 * | 6/2005 | Lee | G06F 17/30905 707/999.001 |
| 2008/0134059 A1 | 6/2008 | Kumar et al. | |
| 2010/0060645 A1 | 3/2010 | Garg et al. | |
| 2012/0306887 A1 | 12/2012 | Mohammad et al. | |
| 2013/0097177 A1 * | 4/2013 | Fan | G06F 17/30554 707/748 |
| 2016/0026695 A1 * | 1/2016 | Fan | G06F 17/30554 707/748 |

OTHER PUBLICATIONS

Weihua Huang, "Scientific Chart Image Recognition and Interpretation"., National University of Singapore 2008, © Copyright 2008 Byweihua Huang (huangwh@comp.nus.edu.sg).

Huang et al., "Model-Based Chart Image Recognition," Graphics Recognition: Recent Advances and Perspectives, 2004, p. 87-99, LNCS 3088, Springer-Verlag Berlin Heidelberg.

Lamiroy et al., "Graphics Recognition: Current Trends and Challenges," 10th International Workshop (GREC 2013)—Revised Selected Papers, 2014, p. 1-265, LNCS 8746, Springer-Verlag Berlin Heidelberg.

(Continued)

*Primary Examiner* — Pavan Mamillapalli
(74) *Attorney, Agent, or Firm* — Patricia B. Feighan; Ryan Lewis

(57) ABSTRACT

A processor-implemented method for generating a chart specification is provided. The method may include identifying at least one chart component within a plurality of chart components associated with an image of a chart. The method may also include determining whether the at least one chart component meets a threshold score. The method may further include identifying elements associated with the at least one chart component when the at least one chart component is determined to meet the threshold score. Additionally, the method may include generating a chart specification based on the identified elements.

20 Claims, 5 Drawing Sheets

(56) References Cited

OTHER PUBLICATIONS

Wikipedia, "Converting Scanned Graphs to Data," Wikipedia: the Free Encyclopedia, Last Modified on Sep. 26, 2014, p. 1-3, https://en.wikipedia.org/wiki/Converting_scanned_graphs_to_data, Accessed on Mar. 16, 2016.

Wilkinson, "Reader," The Grammar of Graphics, 2005, p. 611-622, Second Edition, Chapter 19, Springer-Verlag New York.

Zhou et al., "Learning-Based Scientific Chart Recognition," 4th IAPR International Workshop on Graphics Recognition (GREC 2001), 2001, 11 Pages.

* cited by examiner

GENERATING A CHART SPECIFICATION BASED ON IMAGE RECOGNITION OF CHART PARTS

FIELD OF THE INVENTION

The present invention relates generally to the field of computing, and more particularly to data interpretation.

BACKGROUND

Analysis of data is a process of inspecting, cleaning, transforming, and modeling data with the goal of discovering useful information, suggesting conclusions, and supporting decision making. Data analysis may have multiple facets and approaches, encompassing diverse techniques. However, interpreting and analyzing different types of data may be very challenging, especially for users who are not very familiar with the data they are visualizing. One tool for helping users understand their data may be the use of a relevant visualization, such as a chart, of the data. Therefore, choosing a proper chart may greatly enhance a user's understanding and interpretation of their data.

In recent years, new types of charting engines have been developed that provide vast libraries of charts for industry specific data. The charting engines may prove to be a powerful new tool for data analysts. Some of the charting engines may allow new chart types to be created by a visualization author using a specification language. The specifications may then be applied to a given set of data in order to render a chart. Current charting engine technology includes charting engines, such as the Rapidly Adaptive Visualization Engine (RAVE). RAVE uses a specification adapted from the Grammar of Graphics definition. Although very powerful, such systems may still require a visualization author that is skilled in the language of the specification they need to create. These languages may often be very complex since they provide a rich set of chart features. Therefore, a typical user, who may simply want to understand their data may have to rely on the existing charts within the system that have been created by such experts.

SUMMARY

A processor-implemented method for generating a chart specification is provided. The method may include identifying at least one chart component within a plurality of chart components associated with an image of a chart. The method may also include determining whether the at least one chart component meets a threshold score. The method may further include identifying elements associated with the at least one chart component when the at least one chart component is determined to meet the threshold score. Additionally, the method may include generating a chart specification based on the identified elements.

A computer system for generating a chart specification is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include identifying at least one chart component within a plurality of chart components associated with an image of a chart. The method may also include determining whether the at least one chart component meets a threshold score. The method may further include identifying elements associated with the at least one chart component when the at least one chart component is determined to meet the threshold score. Additionally, the method may include generating a chart specification based on the identified elements.

A computer program product for generating a chart specification is provided. The computer program product may include one or more computer-readable storage devices and program instructions stored on at least one of the one or more tangible storage devices, the program instructions executable by a processor. The computer program product may include program instructions to identify at least one chart component within a plurality of chart components associated with an image of a chart. The computer program product may also include program instructions to determine whether the at least one chart component meets a threshold score. The computer program instructions may further include program instructions to identifying elements associated with the at least one chart component when the at least one chart component is determined to meet the threshold score. Additionally, the computer program product may include program instructions to generate a chart specification based on the identified elements.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
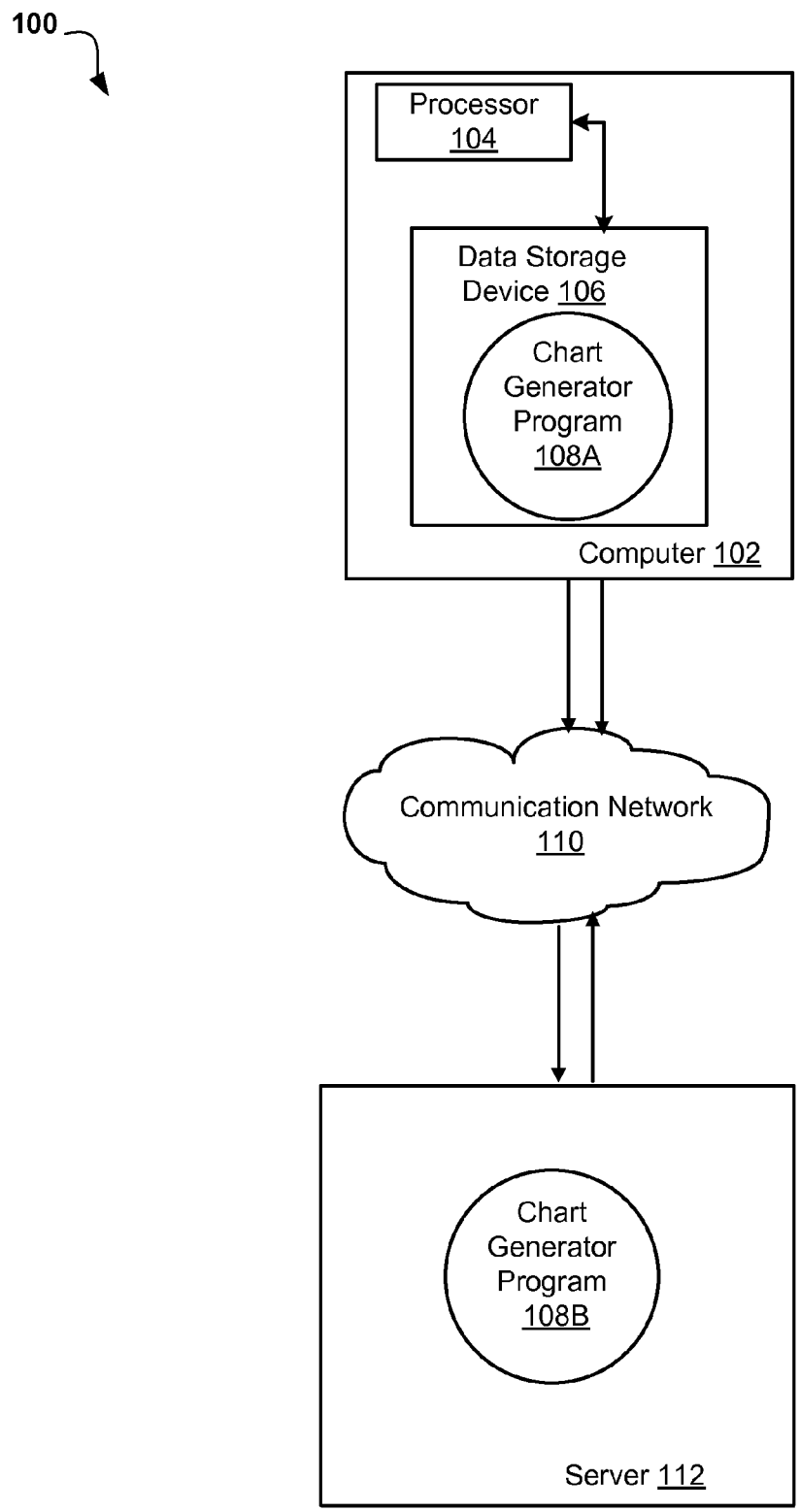
FIG. 1 is a block diagram which illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to data interpretation. The following described exemplary embodiments may provide a system, method and program product for generating a chart specification based on image recognition of the chart parts.

As previously described, interpreting and analyzing different types of data may be very challenging, especially for users who may not be very familiar with the data they are visualizing. One tool for helping users understand their data may be the use of a relevant visualization, such as a chart, of the data. Therefore, choosing a proper chart may greatly enhance a user's understanding and interpretation of their data. Although, new types of charting engines have been developed that provide vast libraries of charts for industry specific data, many systems may still require a visualization author that is skilled in the language of the specification they need to create. As such, a typical user, who simply wants to understand their data, must rely on the existing charts within the system that have been created by such experts rather than the user being able to define a new visualization specification. As such, it may be advantageous, among other things, for a user, who understands how they may want to view their data, but may not have the knowledge or capabilities to define a new visualization specification, to be allowed to create an entirely new chart type to view the data.

According to at least one embodiment of the present invention, existing image recognition algorithms may be used to identify charting components within a user provided image or sketch. Additionally, a charting specification may be constructed and may be saved in a library of charts within a system. The newly created chart type may then be applied to any relevant data to visualize the data. Furthermore, according to at least one embodiment, a user who may understand how they may want to view their data, but does not have the knowledge or capabilities to define a new visualization specification, may be allowed to create an entirely new chart type to view their data. Also, according to at least one implementation, a library describing patterns of predefined chart parts, which may be supported by the underlying visual specification language, may be used. As such, existing image recognition techniques may be used to identify each part (i.e., component) of the sketch or image and the part's location within the sketch or provided image. Then, according to at least one implementation, once each part of the sketch or image is identified, the visual specification for the new chart type may be assembled by the system and may be made available to the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments may provide a system, method and program product for generating a chart specification based on image recognition of the chart parts.

According to at least one embodiment of the present invention, the system may include a library of predefined chart parts. Each chart part in the library may contain an image pattern; a set of identifiable attributes, such as color, size, location; and a template describing how to serialize a particular part of the chart into the visualization specification. Serialization is the process of translating data structures or object state into a format that can be stored.

Additionally, according to at least one embodiment, elements associated with at least one chart component associated with an image of a chart may be identified. Then it may be determined whether the chart component meets a threshold score. The threshold score may be a pre-determined value (e.g., a percentage match) generated by known image recognition techniques. Furthermore, the threshold score may be tuned or configured. Also, elements associated with the chart component may be identified. The identifying of the elements associated with the chart components may include identifying attributes associated with the chart component when the chart component is determined to meet the threshold score; identifying a size and a location associated with the chart component when the chart component is determined to meet the threshold score; identifying a shared attribute between the chart component and at least one other chart component within a plurality of chart components; and determining a data requirement associated with the chart component when the chart component is determined to meet the threshold score. Then a chart specification may be generated which includes serializing the chart components associated with the image of the chart; arranging the serialized chart components into a specification; eliminating at least one chart component that conflicts with at least one other chart component within a plurality of chart components; and using a template default to fill in a template gap.

Referring now to FIG. 1, an exemplary networked computer environment 100 in accordance with one embodiment is depicted. The networked computer environment 100 may include a computer 102 with a processor 104 and a data storage device 106 that is enabled to run a chart generator program 108A. The networked computer environment 100 may also include a server 112 that is enabled to run a chart generator program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a chart generator program 108A and 108B may run on the client computer 102 or on the server computer 112. The chart generator program 108A, 108B may be executed to generate a chart specification based on image recognition of the chart parts. For example, a user using a chart generator program 108A, running on a client computer 102 may connect via a communication network 110 to server computer 112 which may also be running a chart generator program 108B. Furthermore, the user using client computer 102 or server 112 may sketch a chart and scan an image of the sketched chart into the system or upload a chart image from the web. Then, the chart generator program 108A, 108B may utilize image recognition techniques on each part of the chart to determine potential matches within the image (i.e., the visualization). For example, for each chart part that meets a pre-determined threshold score, the chart generator program 108A, 108B may use additional image recognition techniques to analyze the chart parts further to create a specification describing the visualization without being associated with the data. Additionally, according to one implementation, the predetermined threshold may be generated by the image recognition techniques and tuned or configured further according to a customer or client's requirements. The chart generator method is explained in further detail below with respect to FIG. 3A-3B.

Figure 2:
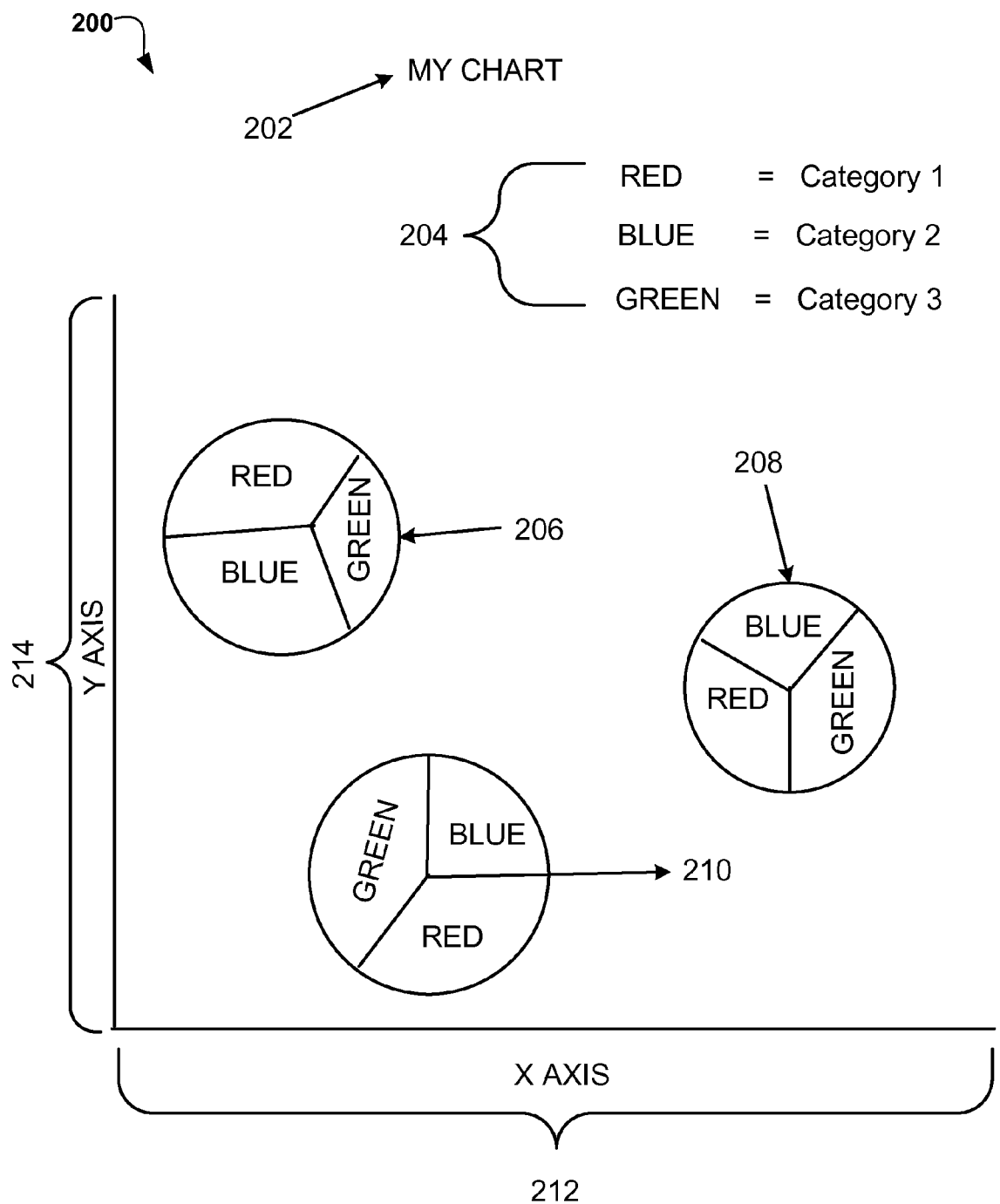
FIG. 2 illustrates an example of a chart according to at least one embodiment.

Referring now to FIG. 2, an example of a chart according to at least one embodiment is depicted. According to at least one implementation of the present embodiment, a user may sketch a chart, such as the chart 200 depicted in FIG. 2. The chart generator program 108A, 108B (FIG. 1) may identify the parts of the chart 200. For example, the chart generator program 108A, 108B may identify text elements, such as the words "MY CHART" 202 at the top of the chart 200 when parsed using text recognition. Additionally, the chart generator program 108A, 108B may determine that a data item is required on the bottom of the chart 200 when an "x axis" 212 is identified. Similarly, the chart generator program 108A, 108B may determine that a data item is required on the left side of the chart 200 when a "y axis" 214 is identified. Furthermore, the chart generator program 108A, 108B may determine that a plurality of pies 206-210 located on the chart 200 requires a data set and the plurality of pies 206-210 located between the axes 212, 214 may require 2 data items for the "X" and "Y" coordinates. Also, the chart generator program 108A, 108B may determine a legend 204 located at the top right of the chart having a 3 color palette, such as red, blue and green requires a data set.

According to one implementation, the chart generator program 108A, 108B may determine that the axes 212, 214 each have an assigned range of values which may be shared with other parts of the chart 200 by specifying the locations of the values assigned to the axes 212, 214. Additionally, according to at least one implementation, the chart generator program 108A, 108B may note that the legend 204 and pies 206-210 may share a data set that specifies colors. Furthermore, since there may be a plurality of pies associated with the chart 200, the chart generator program 108A, 108B may require a set of data items to iterate over and create each pie 206-210. Similarly, according to at least one implementation, the chart generator program 108A, 108B may require another data item for the size of each pie 206-210. Then, according to at least one implementation, the chart generator program 108A, 108B may arrange the previously described elements (text element, axes (x and y), set of pies, legend) into a specification describing the chart. For example:

```
<spec>
    <title>My Chart</title>
    <Axis location="bottom" data="data 1"/>
    <Axis location="left" data="data 2"/>
    <Set data="data set 1">
        <Pie data="data set 2">
            <Location X="data1" Y="data2"/>
            <Size value="data3"/>
        </Pie>
    </Set>
    <Legend data="data item 1"/>
</spec>
```

According to embodiments of the present invention, the specification may be combined in different ways, by identifying different components, or different relationships between the components. The result may be implemented as a best scoring combination according to rules defined in the library of chart components. As such, it may be possible to provide a complete list of all possibilities as well. The specification may then be available in the system for use with any data set containing enough data to render the elements in the specification.

Figure 3A:
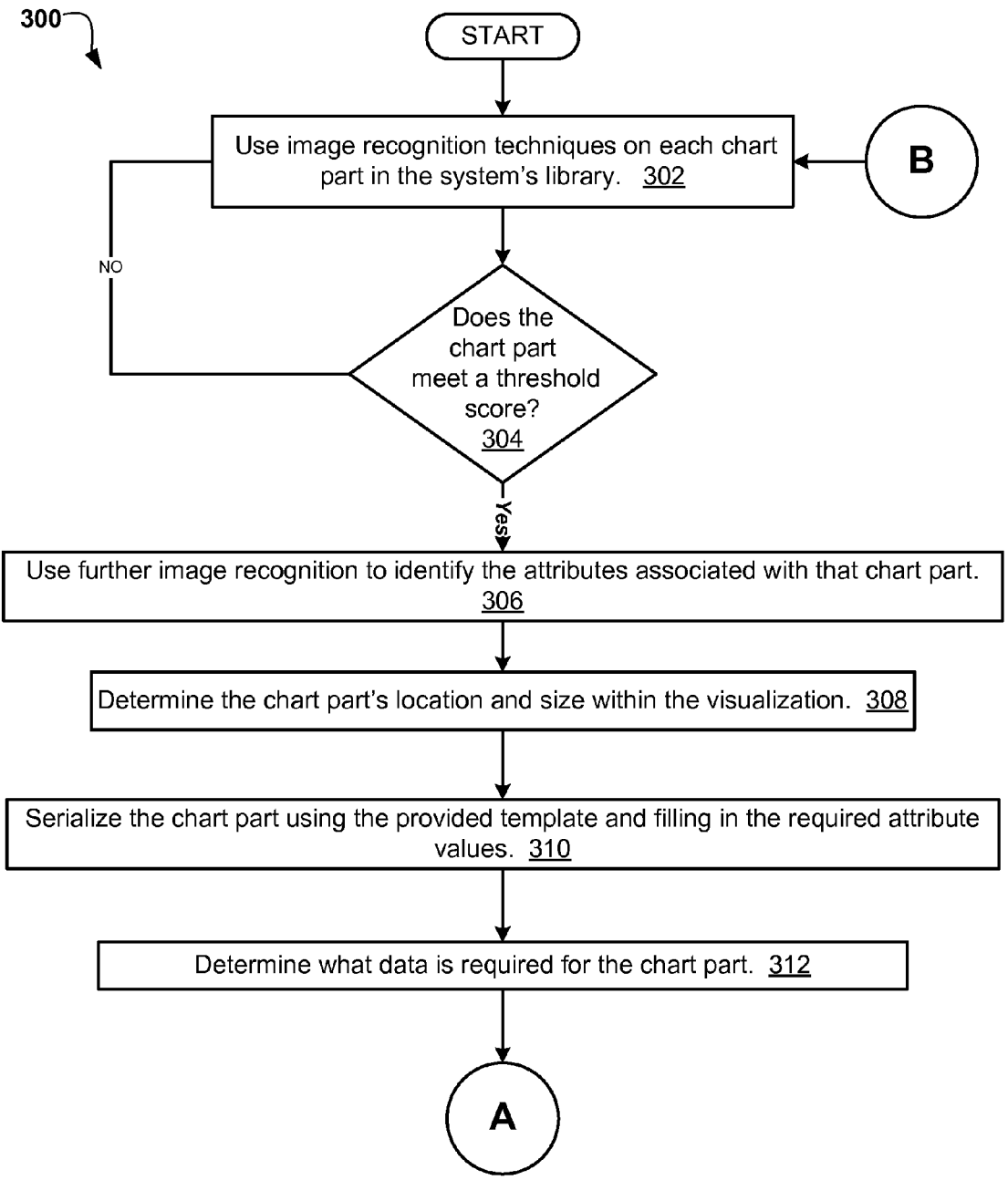
FIG. 3A-3B is an operational flowchart illustrating the steps carried out by a program to generate a chart specification based on image recognition of chart parts according to at least one embodiment.
Figure 3B:
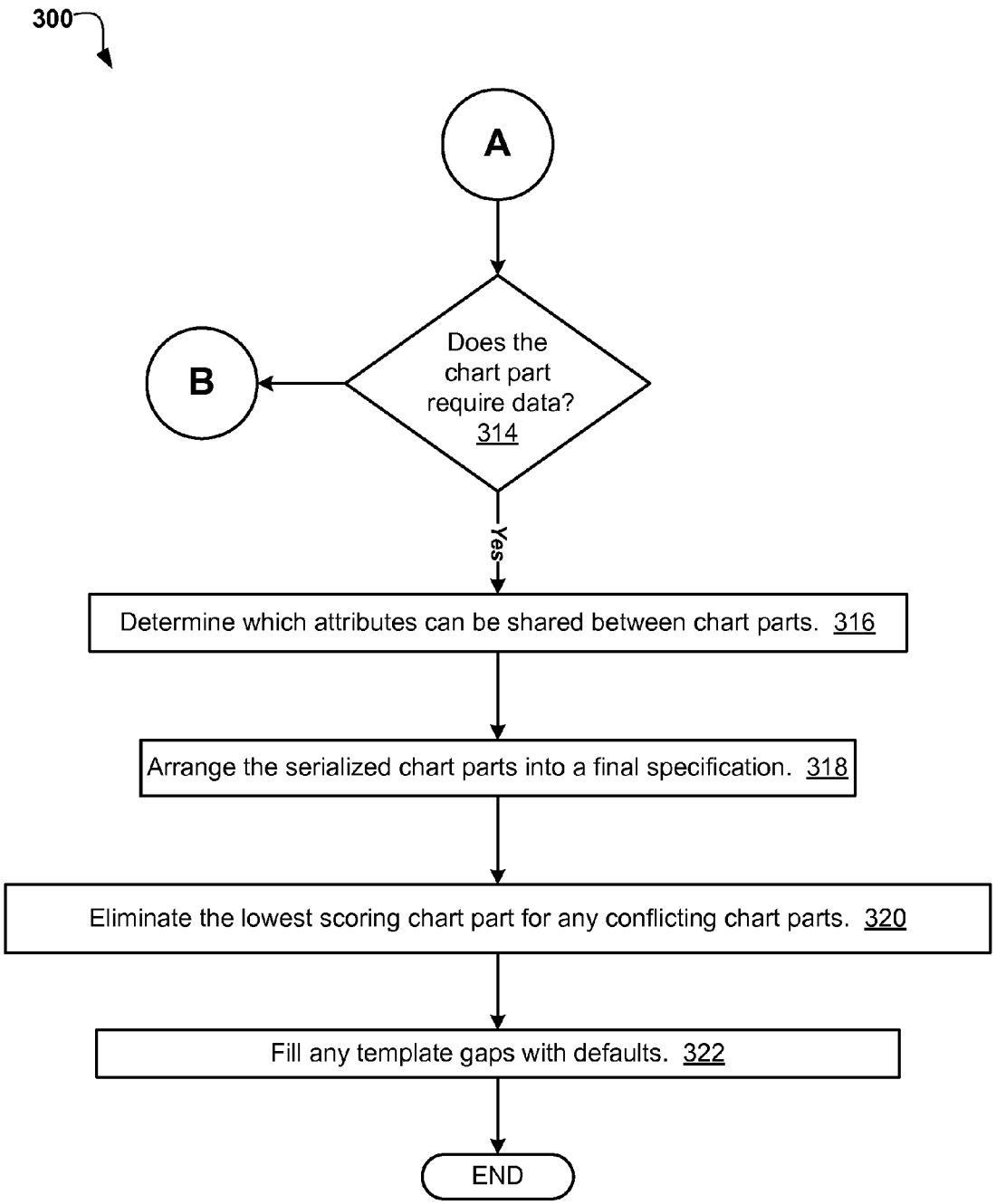

Referring now to FIG. 3A-3B, operational flowchart 300 illustrating the steps carried out by a program to generate a chart specification based on image recognition of chart parts according to at least one embodiment is depicted. For example, the embodiment may be implemented as running on a client computer 102 (FIG. 1) or a server computer 112 (FIG. 1). As such, a user using client computer 102 or server 112 may sketch a chart and scan an image of the sketched chart into the system. Then, the chart generator program 108A, 108B (FIG. 1) may utilize image recognition techniques on each part of the chart to determine potential matches within the image (i.e., the visualization). For example, for each chart part that meets a pre-determined threshold score, the chart generator program 108A, 108B may use additional image recognition techniques to analyze the chart parts further to create a specification describing the visualization without being associated with the data.

Referring to FIG. 3A-3B at 302, the chart generator program 108A, 108B (FIG. 1) may use image recognition techniques on each chart part in the system's library. Each system may have a library of patterns that the system would recognize in the image, such as subsets of the image that the system may recognize the shape of. For example, with respect to FIG. 2, which was previously described, the chart generator program 108A, 108B (FIG. 1) may recognize the shape of the pies 206-210 (FIG. 2) since the pie is a depicted as a circle divided into parts. Additionally, the chart generator program 108A, 108B (FIG. 1) may recognize a vertical (i.e., Y axis 214 (FIG. 2)) and a horizontal (i.e., X axis 212 (FIG. 2)) axis. According to one implementation, the chart generator program 108A, 108B (FIG. 1) may use a scoring system based on the location of the shape to determine the pattern recognition of the shape. For example, the X axis 212 (FIG. 2) may be located at the bottom of the image and may be determined to be a horizontal line and as such may score highly against the pattern contained in the system for an X axis. Similarly, since a Y axis is vertical and is located on the left-hand side of the image may, it may score highly against the pattern contained in the system for a Y axis. According to one implementation, the system may generate a different score for shapes, such as pies 206-210 (FIG. 2) to determine a match.

Next, at 304, the system may determine whether each chart part meets a threshold score using known image recognition techniques. If at 304, the system determines that the chart part does not meet a threshold score using known image recognition techniques, then the chart generator program 108A, 108B (FIG. 1) may continue back to 302, to examine more parts of the chart.

According to one implementation, the threshold score may be a pre-determined value (e.g., a percentage match) generated by known image recognition techniques. Furthermore, the threshold score may be tuned or configured when the chart generator program 108A, 108B (FIG. 1) is implemented into an existing library system of charts. Additionally, according to at least one implementation, the threshold score may be tuned or configured further according to a user's requirements. For example, the chart generator program 108A, 108B (FIG. 1) may determine that a threshold of 70% must be met when comparing the chart part to patterns in the system. Therefore, if the chart part being examined is a 70% match to a pattern in the system then the chart part may be flagged as being found. According to one implementation, the threshold may be a configuration item. The threshold may be tuned (i.e., adjusted) to gain the most accurate results. The extent of the tuning may depend on the set of patterns that are being used. For example, a very extensive set of patterns may require a higher threshold since the chart parts may need to precisely match the patterns in the system. Conversely, a small set of patterns may require a lower threshold since the likelihood of the chart part matching any pattern is low. Additionally, according to at least one implementation, a threshold score may be generated by the image recognition algorithm and assigned to a chart part when a chart part is examined for a match to a pattern.

Then at 306, further image recognition techniques may be used to identify the attributes associated with the chart part being examined. For example, a shape may be identified, such as a pie shape 206-210 (FIG. 2) and the attributes that are not specific to the data being run may be identified. The attributes may be configurable elements of the chart that are not specific to the data being run. For example, the color palettes 204 (FIG. 2) associated with a pie shape, such as red, green or blue may be identified. Another example of an attribute may be the length of an axis 212, 214 (FIG. 2) which is not specific to the data being run.

Next, at 308, the chart part's location and size within the visualization may be determined. The location and size of the chart part may be attributes that are discovered through the image recognition technology. However, the location and size may need to be interrelated. For example, if a horizontal axis (e.g., X axis 212 (FIG. 2)) and a vertical axis (e.g., Y axis 214 (FIG. 2) are going to be added to a chart, then the X axis 212 (FIG. 2) and a Y axis 214 (FIG. 2) may need to be joined. Additionally, the location of the chart parts, such as pie shapes 2016-210 (FIG. 2), may be interrelated with respect to the location of the X axis 212 (FIG. 2) and a Y axis 214 (FIG. 2).

Then at 310, the chart part is serialized by using the provided template and filling in the required attribute values. A system template may be associated with each of the chart parts in the system library that are recognized. This may aid in serializing that particular chart part in the specification. As such, the attributes that were discovered in the previous steps 306 and 308, may be filled in to the template.

Next at 312, the data that is required for the chart part is determined. Each part of the chart may have requirements. For example, if there is an X axis 212 (FIG. 2), then there may need to be a numerical data item that maps to the X axis 212 (FIG. 2). Similarly for a Y axis 214 (FIG. 2), there may need to be a numerical data item that maps to the Y axis 214 (FIG. 2). Additionally, the pie charts that are distributed within the visualization may require the following sets of values: an X and Y coordinate which may require 2 numerical data items; the varying size of the pies which may require a numerical data item; and categorical data which may be required, such as the color palette of the pie charts. For example, according to one implementation, a 3 color palette of red, blue and green may require a numerical data set.

Then at 314, it is determined whether the chart part requires data. If at 314, it is determined whether the chart part does not require data, the program continues back to step 302 of the program. If it is determined at 314 that the chart part requires data then at 316, it is determined which attributes may be shared between the chart parts. For example, it may be determined that the X coordinates of a pie chart 206-210 (FIG. 2) and the X axis 212 (FIG. 2) are horizontal coordinates that may be shared. As such, the same set of values may be used to define the X coordinates of a pie chart 206-210 (FIG. 2) and the X axis 212 (FIG. 2). Similarly, the same would be determined for the Y axis 214 (FIG. 2).

Next at 318, the serialized chart parts are arranged into a final specification. As such a template is created describing how to serialize a particular part of the chart into the visualization specification. Then, at 320, the lowest scoring chart part for any conflicting parts is eliminated. According to at least one implementation, the best scoring combination of chart parts according to rules that are pre-defined in a library of chart components may be selected. Therefore, if any parts of the chart conflict and cannot coexist within the specification, the lowest scoring part of the chart may be eliminated. For example, a pie shape 206-210 (FIG. 2) may be flagged as a "pie shape" or a "circle shape". As such, the system may determine which shape to select for the specification by selecting the highest scoring shape according to the threshold score of matching the pattern which was previously described with respect to step 304.

Next, at 322, template gaps are filled in with defaults so an entire template may be created. For example, according to one implementation, template gaps may be filled in by having a set of example templates to choose from. As such, the closest template match may be selected and the elements of the selected template may be transferred over to the newly created template. Therefore, a full specification may be run on data that is provided. Additionally, according to at least one implementation, the generated chart specification may be saved in a library of predefined charts.

Figure 4:
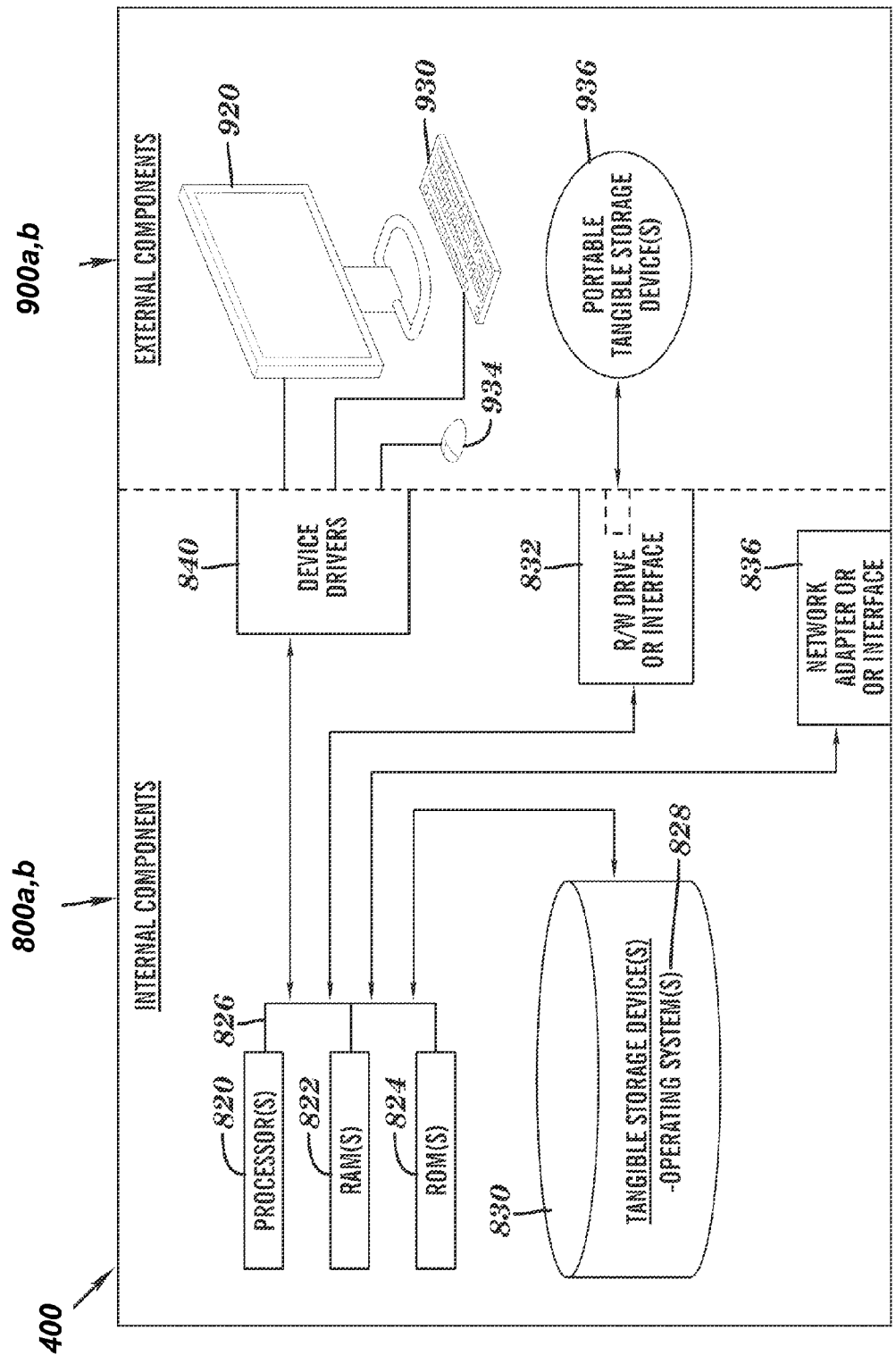
FIG. 4 is a block diagram of internal and external components of computers and servers depicted in FIG. 1 according to at least one embodiment.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 *a, b* and external components 900 *a, b* illustrated in FIG. 4. Each of the sets of internal components 800 *a, b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and chart generator program 108A (FIG. 1) in client computer 102 and chart generator program 108B in network server computer 112 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as chart generator program 108A and 108B, can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless wi-fi interface cards, or 3G or 4G wireless interface cards or other wired or wireless communication links. The chart generator program 108A in client computer 102 and chart generator program 108B in network server 112 can be downloaded to client computer 102 from an external computer via a network (for example, the Internet, a local area network or other, wide area network) and respective network adapters or interfaces 836. From the network adapters or interfaces 836, the chart generator program 108A in client computer 102 and the chart generator program 108B in network server computer 112 are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for generating a chart specification, the method comprising:

receiving, by a computer, a scanned or uploaded image of a chart;

identifying at least one chart component within a plurality of chart components associated with the scanned or uploaded image of the chart, wherein the identification of at least one chart component is performed using a plurality of on-line image recognition techniques and comparing the identified at least one chart component to a library of predefined chart parts stored in a system associated with the computer;

determining whether the at least one chart component meets a threshold score, wherein the threshold score is an automatically generated, predetermined value assigned to the at least one chart component representing a percentage match that is configured according to a plurality of user requirements and according to a plurality of rules defined in the library of predefined chart parts;

identifying elements associated with the at least one chart component when the at least one chart component is determined to meet the threshold score, wherein the identified elements are not specific to a plurality of data associated with the at least one chart component and are recognized from a library of patterns stored in the system associated with the computer which include a shape, a color palette, and a length of an axis;

generating a chart specification based on the identified elements; and storing the generated chart specification in a library containing a plurality of charts within the system associated with the computer.

2. The method of claim 1, wherein the generating of the chart specification based on the identified elements comprises:

serializing the plurality of chart components associated with the image of the chart;

arranging the serialized plurality of chart components into a specification;

eliminating at least one chart component that conflicts with at least one other chart component within the plurality of chart components; and using a template default to fill in a template gap.

3. The method of claim 1, wherein the identifying of elements associated with the at least one chart component comprises:

identifying attributes associated with the at least one chart component when the at least one chart component is determined to meet the threshold score;

identifying a size and a location associated with the at least one chart component when the at least one chart component is determined to meet the threshold score;

identifying a shared attribute between the at least one chart component and at least one other chart component within the plurality of chart components; and determining a data requirement associated with the at least one chart component when the at least one chart component is determined to meet the threshold score.

4. The method of claim 2, wherein the eliminating of the at least one chart component comprises an elimination of a lowest scoring chart component when the at least one chart component is compared to the threshold score.

5. The method of claim 2, wherein the generating of the chart specification further comprises saving the generated chart specification in a library of predefined charts.

6. The method of claim 3, wherein the determining of a data requirement associated with the at least one chart component comprises determining the data requirement as one of a numerical data and a categorical data.

7. The method of claim 3, wherein the identifying of the shared attribute comprises a set of values that define at least two chart components within the plurality of chart components.

8. A computer system for generating a chart specification, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving, by a computer, a scanned or uploaded image of a chart;

identifying at least one chart component within a plurality of chart components associated with the scanned or uploaded image of the chart, wherein the identification of at least one chart component is performed using a plurality of on-line image recognition techniques and comparing the identified at least one chart component to a library of predefined chart parts stored in a system associated with the computer;

determining whether the at least one chart component meets a threshold score, wherein the threshold score is an automatically generated, predetermined value assigned to the at least one chart component representing a percentage match that is configured according to a plurality of user requirements and according to a plurality of rules defined in the library of predefined chart parts;

identifying elements associated with the at least one chart component when the at least one chart component is determined to meet the threshold score, wherein the identified elements are not specific to a plurality of data associated with the at least one chart component and are recognized from a library of patterns stored in the system associated with the computer which include a shape, a color palette, and a length of an axis;

generating a chart specification based on the identified elements; and storing the generated chart specification in a library containing a plurality of charts within the system associated with the computer.

9. The computer system of claim 8, wherein the generating of the chart specification comprises:

serializing the plurality of chart components associated with the image of the chart;

arranging the serialized plurality of chart components into a specification;

eliminating at least one chart component that conflicts with at least one other chart component within the plurality of chart components; and using a template default to fill in a template gap.

10. The computer system of claim 8, wherein the identifying of elements associated with the at least one chart component comprises:

identifying attributes associated with the at least one chart component when the at least one chart component is determined to meet the threshold score;

identifying a size and a location associated with the at least one chart component when the at least one chart component is determined to meet the threshold score;

identifying a shared attribute between the at least one chart component and at least one other chart component within the plurality of chart components; and determining a data requirement associated with the at least one chart component when the at least one chart component is determined to meet the threshold score.

11. The computer system of claim 10, wherein the eliminating of the at least one chart component comprises an elimination of a lowest scoring chart component when the at least one chart component is compared to the threshold score.

12. The computer system of claim 10, wherein the generating of the chart specification further comprises saving the generated chart specification in a library of predefined charts.

13. The method of claim 10, wherein the determining of a data requirement associated with the at least one chart component comprises determining the data requirement as one of a numerical data and a categorical data.

14. The computer system of claim 10, wherein the identifying of the shared attribute comprises a set of values that define at least two chart components within the plurality of chart components.

15. A computer program product for generating a chart specification, the computer program product comprising:

one or more computer-readable storage devices and program instructions stored on at least one of the one or more tangible storage devices, the program instructions executable by a processor, the program instructions comprising:

program instructions to receive by a computer, a scanned or uploaded image of a chart;

program instructions to identify at least one chart component within a plurality of chart components associated with the scanned or uploaded image of the chart, wherein the identification of at least one chart component is performed using a plurality of on-line image recognition techniques and comparing the identified at least one chart component to a library of predefined chart parts stored in a system associated with the computer;

program instructions to determine whether the at least one chart component meets a threshold score, wherein the threshold score is an automatically generated, predetermined value assigned to the at least one chart component representing a percentage match that is configured according to a plurality of user requirements and according to a plurality of rules defined in the library of predefined chart parts;

program instructions to identify elements associated with the at least one chart component when the at least one chart component is determined to meet the threshold score wherein the identified elements are not specific to a plurality of data associated with the at least one chart component and are recognized from a library of patterns stored in the system associated with the computer which include a shape, a color palette, and a length of an axis;

program instructions to generate a chart specification based on the identified elements; and program instructions to store the generated chart specification in a library containing a plurality of charts within the system associated with the computer.

16. The computer program product of claim 15, wherein the generating of the chart specification comprises:

serializing the plurality of chart components associated with the image of the chart;

arranging the serialized plurality of chart components into a specification;

eliminating at least one chart component that conflicts with at least one other chart component within the plurality of chart components; and using a template default to fill in a template gap.

17. The computer program product of claim 15, wherein the identifying of elements associated with the at least one chart component comprises:

identifying attributes associated with the at least one chart component when the at least one chart component is determined to meet the threshold score;

identifying a size and a location associated with the at least one chart component when the at least one chart component is determined to meet the threshold score;

identifying a shared attribute between the at least one chart component and at least one other chart component within the plurality of chart components; and determining a data requirement associated with the at least one chart component when the at least one chart component is determined to meet the threshold score.

18. The computer program product of claim 16, wherein the eliminating of the at least one chart component comprises an elimination of a lowest scoring chart component when the at least one chart component is compared to the threshold score.

19. The computer program product of claim 16, wherein the generating of the chart specification further comprises saving the generated chart specification in a library of predefined charts.

20. The computer program product of claim 17, wherein the determining of a data requirement associated with the at least one chart component comprises determining the data requirement as one of a numerical data and a categorical data.

* * * * *